US012674862B2

(12) United States Patent
Gonzalez et al.

(10) Patent No.: US 12,674,862 B2
(45) Date of Patent: Jul. 7, 2026

(54) METHOD FOR RADAR SENSING USING COMMUNICATION SIGNALS WITH SINGLE CARRIER PREAMBLE AND MULTI-CARRIER DATA

(71) Applicants: Continental Automotive Technologies Gmbh, Hannover (DE); Nanyang Technological University, Singapore (SG)

(72) Inventors: David Gonzalez Gonzalez, Frankfurt am Main (DE); Rakshith Jagannath, Singapore (SG); Yong Linag Guan, Singapore (SG)

(73) Assignees: CONTINENTAL AUTOMOTIVE TECHNOLOGIES GMBH, Hannover (DE); NANYANG TECHNOLOGICAL UNIVERSITY, Singapore (SG)

( * ) Notice: Subject to any disclaimer, the term of this patent is extended or adjusted under 35 U.S.C. 154(b) by 336 days.

(21) Appl. No.: 18/278,692

(22) PCT Filed: Feb. 25, 2022

(86) PCT No.: PCT/EP2022/054810
§ 371 (c)(1),
(2) Date: Aug. 24, 2023

(87) PCT Pub. No.: WO2022/180220
PCT Pub. Date: Sep. 1, 2022

(65) Prior Publication Data
US 2024/0151811 A1 May 9, 2024

(30) Foreign Application Priority Data
Feb. 25, 2021 (EP) .................................... 21159355

(51) Int. Cl.
*G01S 7/00* (2006.01)
*G01S 7/03* (2006.01)
(Continued)

(52) U.S. Cl.
CPC ................ *G01S 7/006* (2013.01); *G01S 7/03* (2013.01); *G01S 13/86* (2013.01); *G01S 2013/9316* (2020.01); *H04B 7/24* (2013.01)

(58) Field of Classification Search
CPC ...... G01S 13/288; G01S 13/582; G01S 13/86; G01S 13/931; G01S 2013/9316; G01S 7/006; G01S 7/03; H04B 7/24
See application file for complete search history.

(56) References Cited

U.S. PATENT DOCUMENTS

| | | | |
|---|---|---|---|
| 5,583,512 A | * | 12/1996 | McEligot .............. G01S 13/325 342/17 |
| 10,536,529 B2 | * | 1/2020 | Davis ................... G01S 13/0209 |

(Continued)

FOREIGN PATENT DOCUMENTS

CN 110352363 A 10/2019

OTHER PUBLICATIONS

International Search Report and Written Opinion for International Application No. PCT/EP2022/054810, mailed Jun. 28, 2022, 10 pages.

(Continued)

*Primary Examiner* — Peter M Bythrow
(74) *Attorney, Agent, or Firm* — Buchanan Ingersoll & Rooney PC

(57) ABSTRACT
The disclosure relates to the field of radar sensors, particularly to radar sensors for radar sensing using wireless communication signals. The method includes: receiving a reflected communication signal, wherein the reflected communication signal is a sent communication signal that is
(Continued)

reflected by at least one object. The frequency of the sent communication signal is within a radar frequency range, and the sent communication signal includes a sent data payload, and the reflected communication signal includes a corresponding reflected data payload. The reflected data payload is compared with the sent data payload, resulting in a compared data payload; and a delay information and/or a velocity information of the at least one object is extracted from the compared data payload.

16 Claims, 9 Drawing Sheets

(51) Int. Cl.
    *G01S 13/86*         (2006.01)
    *G01S 13/931*      (2020.01)
    *H04B 7/24*         (2006.01)

(56)              References Cited

U.S. PATENT DOCUMENTS 11,360,204 B2 *  6/2022  Hakobyan ............ H04B 7/0413

| 2011/0193739 | A1 | | 8/2011 | Strauch et al. | |
| 2014/0035774 | A1 | * | 2/2014 | Khlifi | G01S 7/006 |
| | | | | | 342/21 |
| 2016/0363662 | A1 | * | 12/2016 | Tuttle | G01S 13/582 |
| 2017/0310758 | A1 | * | 10/2017 | Davis | G01S 13/931 |
| 2018/0241822 | A1 | | 8/2018 | Davis et al. | |
| 2019/0011547 | A1 | * | 1/2019 | Han | G01S 13/931 |
| 2020/0072963 | A1 | * | 3/2020 | Yu | G01S 7/006 |
| 2020/0110164 | A1 | * | 4/2020 | Al-Alusi | G01S 13/325 |
| 2020/0153907 | A1 | * | 5/2020 | Davis | G01S 13/325 |
| 2020/0319327 | A1 | * | 10/2020 | Tsvelykh | G01S 13/933 |
| 2021/0255301 | A1 | * | 8/2021 | Campbell | G01S 13/284 |
| 2022/0053463 | A1 | * | 2/2022 | Aksu | H04W 72/1273 |
| 2024/0085519 | A1 | * | 3/2024 | Alalusi | G01S 7/2886 |

OTHER PUBLICATIONS

Office Action (The First Office Action) issued Mar. 23, 2026, by the State Intellectual Property Office of People's Republic of China in corresponding Chinese Patent Application No. 202280017068.3 and an English translation of the Office Action. (22 pages).

* cited by examiner (a) MLW = $(2T_{c}s.(\frac{8B}{N_{g}})H_{z})$, PSL = -11.5877dB (b) MLW = $(2T_{c}s.(\frac{2B}{N_{g}})H_{z})$, PSL = -11.8013dB (c) MLW = $(2T_{c}s.(\frac{2B}{N_{g}})H_{z})$, PSL = -11.8013dB

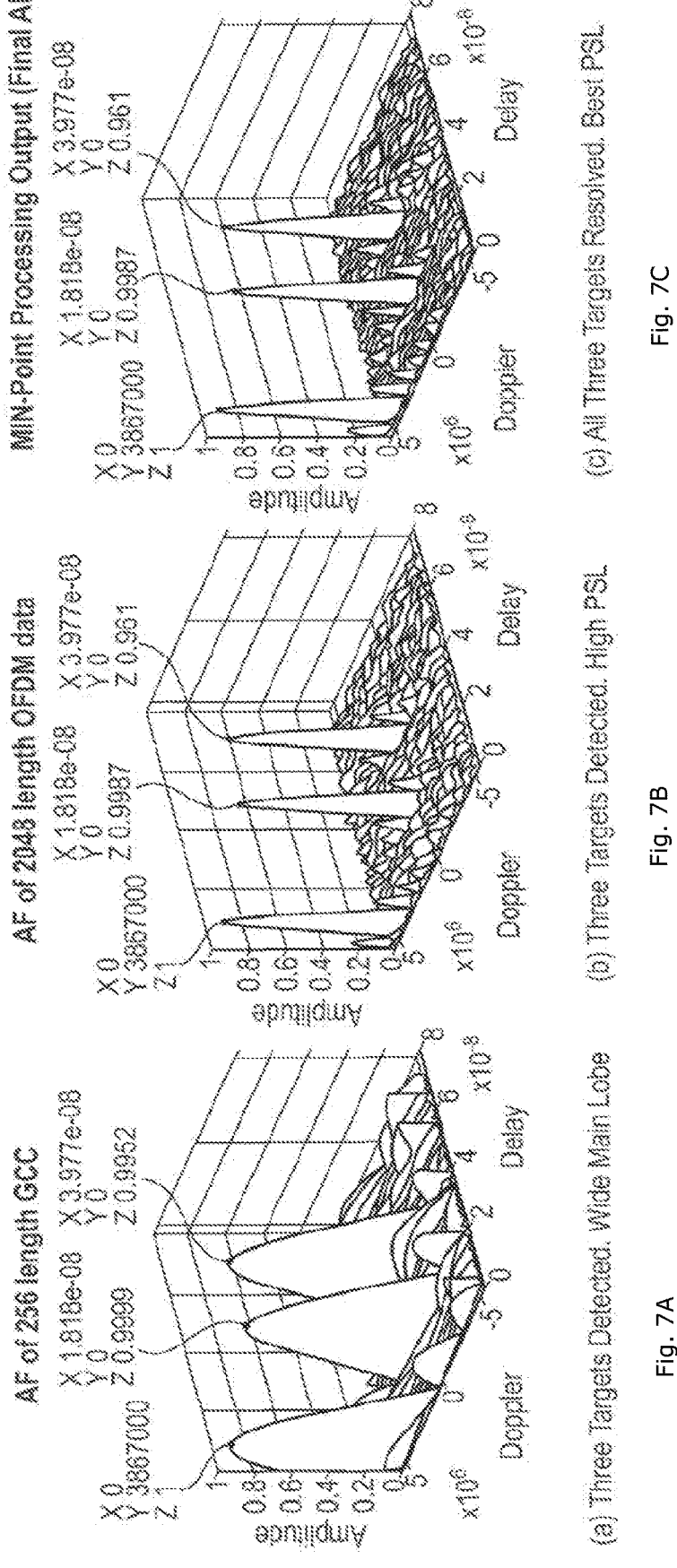

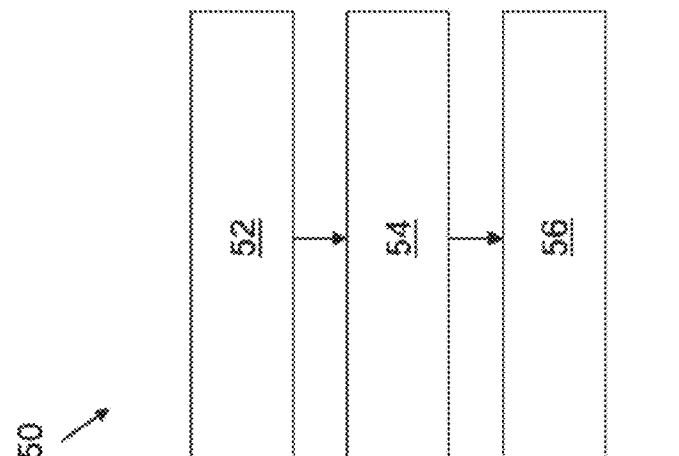
Fig. 8

METHOD FOR RADAR SENSING USING COMMUNICATION SIGNALS WITH SINGLE CARRIER PREAMBLE AND MULTI-CARRIER DATA

CROSS-REFERENCE TO RELATED APPLICATIONS

This application is the U.S. National Phase Application of PCT International Application No. PCT/EP2022/054810, filed Feb. 25, 2022, which claims priority to European Patent Application No. 21159355.3, filed Feb. 25, 2021, the contents of such applications being incorporated by reference herein.

FIELD OF THE INVENTION

The invention relates to the field of radar sensors, particularly to radar sensors used for radar sensing using wireless communication signals. The invention further relates to a computer program product, to a computer-readable storage medium, to a receiver, a system, a vehicle, and to a use.

BACKGROUND OF THE INVENTION

Communication systems at least in some cases use very high frequencies for communicating, for instance to provide a high communication bandwidth. Some of these communication systems operate in frequency ranges that are also used by radar sensing apparatuses. Hence, to enable communication systems, which use such high communication frequencies, also for radar sensing would be desirable.

SUMMARY OF THE INVENTION

An aspect of the invention is a method that enables communication systems, which use high communication frequencies, also for radar sensing.

One aspect relates to a method for radar sensing using wireless communication signals. The method comprises the steps of:

receiving a reflected communication signal, wherein the reflected communication signal is a sent communication signal that is reflected by at least one object, wherein the frequency of the sent communication signal is within a radar frequency range, and wherein the sent communication signal comprises a sent data payload and the reflected communication signal comprises a corresponding reflected data payload;

comparing the reflected data payload with the sent data payload, resulting in a compared data payload; and extracting a delay information and/or a velocity information of the at least one object from the compared data payload.

The method for radar sensing using wireless communication signals uses at least some of the components of a communication system also for radar sensing methods. The radar sensing methods may include to capture a distance to a sensed object, an angle of this object to a predefined axis, a velocity of this object, and/or further attributes of this object.

The method may use a standard communication system, particularly a standard transmitter, for sending a communication signal. A receiver or a receiver part configured for performing the method may comprise novel and/or non-standard parts and/or may use non-standard methods. The communication system may be configured for supporting communication signals within a radar frequency range.

The communication system may receive a reflected communication signal. The reflected communication signal may have been sent by the transmitter part of the communication system. The sent communication signal may have been reflected by one or more objects. This may be supported by the communication system by providing a broad sending angle. The objects may comprise all kinds of moving, standing and not-moveable objects, for example buildings, vehicles, pedestrians, animals, and/or further objects. The frequency of the sent communication signal may be within a radar frequency range, e.g. a frequency above 30 MHz; at least some of the communication systems may use frequencies, which may be sent by quite small devices, for example frequencies in ranges between 30 GHz and 300 GHz. The quite small devices of the communication system may be used in a vehicle, for example in a car, a motor cycle, a bus, a truck, a boat or ship, and/or a flying vehicle.

The communication system may use one or more standard and/or proprietary protocol(s), which may be adapted for communicating the communication signal within the radar frequency range. The protocol may comprise a data payload part and a header or preamble part. The data payload part may be bigger or longer than the header or preamble part. The data payload part may comprise information and/or bit-sequences of any kind, i.e. its bit-sequences are not standardized, but may be filled with arbitrary information. In contrast to this, the header or preamble part may comprise or consist of standardized and/or determined information. The "data payload part", as used for this method, may comprise further parts of the protocol, such as CRC (cyclic redundancy check), etc., header parts, training parts, and/or further parts. The object(s) that reflect(s) the sent communication signal may reflect the complete bit-sequence of the sent communication signal; hence, the reflected communication signal—as received by the receiver part—may comprise a reflected data payload part, a reflected header part, a reflected preamble part, and so on, which parts correspond to the corresponding parts the sent communication signal.

The receiver part compares the data payload of the reflected communication signal with the data payload of the sent communication signal or with a copy of the data payload of the sent communication signal. In cases when only the reflected data payload part is considered and/or analysed, the comparing may be limited to this part. To ease this comparing, the receiver part may be co-located to the corresponding transmitter part. The result of the comparing may be called the compared data payload. As an example, the comparing may be achieved by using a matched filter or a bank of correlators. The output of the matched filter (etc.) may, from a mathematical point of view, be identical to a so-called radar ambiguity function; see below for an example.

The compared communication signal may be used as a basis for extracting a delay and/or a velocity information of the at least one object, which had reflected the communication signal. The delay information may also be named as a "range" or "distance" information, and the velocity information may also be named as a "Doppler" information.

An advantage of this method is that it only affects the receiver part of the communication system; the transmitter part may be kept unchanged. Thus, the overall costs for providing both a wireless communication function and a radar sensing function may be reduced significantly. This not only affects the manufacturing of related devices, but also testing, maintenance and further aspects. Moreover, using the data payload for the comparing step, makes this approach highly flexible. Consequently, the method can be based not only on well-known bit-sequences—such as on preambles of some protocols—, but on almost any bit-sequences, for instance the arbitrary bit-sequences of the data payload, even on any part of any communication protocol. This, further, gives room for comparing quite long bit-sequences, i.e. longer bit-sequences than known in at least most of the current protocols. This is particularly advantageous, because, as a rule of thumb, the longer the bit-sequences are, which can be compared, the higher may the resulting signal/noise ratio be, thus providing more precise information on the object(s) the communication signal is reflected from. As an additional advantage, the longer the bit-sequences are, the better the velocity resolution will be.

In various embodiments, the sent communication signal further comprises a sent preamble part and the reflected communication signal further comprises a corresponding reflected preamble part, and, further, the comparing further comprises the sent preamble part and the reflected communication signal further comprises the corresponding reflected preamble part, resulting in a compared preamble part, and the extracting additionally considers the compared preamble part. The preamble part, at least of some protocols—for instance the preamble part of IEEE 802.11ad protocol—has special properties, which may improve the quality of the radar sensing operation. These properties may include that the preamble part is (pre-)determined, i.e. it is known to all receiving apparatuses, because it is defined in the protocol's standard. Thus, a strategy of combining these protocol parts, turned out to be highly efficient. For an evaluation of both the data payload part and the preamble part, the evaluation channels or parts of the receiver may be split, e.g. for computing their ambiguity function either in time domain or in frequency domain.

In various embodiments, the comparing comprises computing an ambiguity function, as an output of comparing the reflected data payload with the sent data payload and/or the reflected preamble part with the sent preamble part. For this method, following channel model for the radar processing is assumed:

$$h(t) = \sum_{l=0}^{L-1} \alpha_l \delta(t - \tau_l(t)) \qquad \text{(Eq. 1)}$$

where L is the number of objects that reflect the transmitted signal. $\alpha_l$ and $\tau_l$ are the attenuations and delays due to the $l^{th}$ target. The delay $\tau_l$ between the transmitted signal and the received signal is related to the distance and velocity of the $l^{th}$ moving object. The received signal is given by the convolution (denoted by an asterisk) of the transmit signal u(t) and the wireless channel h(t) of Eq. 1:

$$r(t) = h(t) \star u(t) = \sum_{l=0}^{L-1} \alpha_l u(t - \tau_l(t)) + n(t) \qquad \text{(Eq. 2)}$$

The received signal may be mixed down to an intermediate frequency or "baseband", thus resulting in a baseband signal y(t). The oscillator signal used for mixing may be the same oscillator signal as used in the transmitter part.

The ambiguity function(s) of the received reflected communication signal may be achieved by comparing the received reflected communication signal with a copy of the delayed and Doppler shifted transmit signal for different delays and Doppler shifts. In various embodiments, the comparing comprises using a 2-D matched filter or a bank of correlators. The 2-D matched filtering operation on the received signal results in the a so-called radar ambiguity function A(τ, f):

$$A(\tau, f) = y(\tau) \star \tilde{s}^*(-\tau, f) \qquad \text{(Eq. 3)}$$

where the asterisk denotes a convolution, and $$\tilde{s}(\tau, f) = \sum_{k=0}^{K-1} s_k rect\left(\frac{\tau - kT_c}{T_c}\right) e^{j2\pi ft} \qquad \text{(Eq. 4)}$$

is the baseband transmit signal delayed by τ, and Doppler shifted by f, and s* denotes a complex conjugate. The output of the 2-D matched filter in Eq. 3, i.e. the radar ambiguity function, is a two-dimensional function of time delay and Doppler frequency. The peaks in the radar ambiguity function A(τ, f) occur at the L points corresponding to the range and velocity $(d_l, v_l)$ of the L targets. Hence, the ambiguity function A(τ, f) contains all the information that is required for the extraction of delay and Doppler information of the object. The radar ambiguity function measures the distortion of the returned radar signal at the output of the receiver 2-D matched filter from moving targets due their initial delays and the corresponding Doppler shifts. Accordingly, the quality of the ambiguity function determines the quality of the range-velocity estimates.

For a continuous signal s(t) specified in the time domain, its radar ambiguity function $A_{ss}(\tau, f)$ is given by $$A_{ss}(\tau, f) = \int_{-\infty}^{\infty} s(t)s^*(t-\tau)e^{j2\pi ft}dt \qquad \text{(Eq. 5)}$$

And, analogously, the radar ambiguity function $A_{SS}(\tau, f)$ for a signal, S(u) specified in the frequency domain is:

$$A_{SS}(\tau, f) = \int_{-\infty}^{\infty} S(u)S^*(u-f)e^{j2\pi u\tau}du \qquad \text{(Eq. 6)}$$

Note that, if S(u) is the Fourier transform of s(t), then: $A_{ss}(\tau, f) = A_{SS}(\tau, f)$, because the same transmit signal results in the same ambiguity function.

For a discrete sequence x(n) of length N, which represents the samples of a time domain signal, its radar ambiguity function is given by $$A_{xx}(m, k) = \sum_{l=1}^{N-m} x(l)x(l+m)e^{j2\pi \frac{kl}{N}} \qquad \text{(Eq. 7)}$$

Applied, as an example, to an IEEE 802.11ad PHY frame single carrier (SC) preamble sequence $Ga_{256,u}$ (analogously to $Gb_{256,u}$) of length N=256, its ambiguity function is given by $$A_{Ga_{256,u}}(m, k) = \sum_{l=1}^{N-m} Ga_{256,u}(l)Ga_{256,u}(l+m)e^{j2\pi \frac{kl}{N}} \qquad \text{(Eq. 8)}$$

Similarly, the radar ambiguity function for a frequency domain sequence X(p) is given by:

$$A_{XX}(m,k) = \sum_{p=1}^{N-k} X(p)X(p+k)e^{j2\pi\frac{mp}{N}} \qquad \text{(Eq. 9)}$$

Applied, as a further example, to an IEEE 802.11ad PHY frame random OFDM data sequence Y(P) of length $N=N_d$, its ambiguity function is given by $$A_{dat}(m,k) = \sum_{p=1}^{N-k} Y(p)Y(p+k)e^{j2\pi\frac{mp}{N}} \qquad \text{(Eq. 10)}$$

As pointed out above, the OFDM data sequence (in general) may be significantly longer than the preamble sequence. On the one hand, this may lead to a significantly improved quality of the radar sensing. On the other hand, this may raise and additional technical difficulty, because the data AF and the preamble AF may have different number both of delay bins and Doppler bins. As a result, combining them by using min-point selection (as described below) in a "straight-forward manner" may not be feasible, and it may be useful to consider their different lengths and characteristics in an adequate way. Please note that the concept of "min-point selection" is described further below.

In an embodiment, AF Bins for the min-point selection may be performed as follows:

Supposing the OFDM data sequence (in general) being much longer than the preamble sequence. Hence, the data AF and the preamble AF will have different number of delay bins and Doppler bins. Hence, a method is disclosed to combine them in and adequately adapted way and also using min-point selection.

We note that a requirement for performing the min-point selection is that the AF of the data sequence, $A_{dat}(m, k)$ as well as the AF of the Golay sequence, $A_{Ga,256,u}(m, k)$ should have the same number of bins and same bin-widths. Let the length of the Golay sequence be $N_g$ and the length of the data sequence be $N_d$. In the following, we describe the procedure for re-sampling and appending the Golay AF for obtaining the same number of bins as the data AF.

1) Sample the Doppler axis in the Golay AF $A_{Ga,256,u}$(m, k) by finer bins at $k/N_d$, [k=0, ±1, ±2, . . . , ±((N_d/2)−1)] instead of previous bins at $k/N_g$, [k=0, ±1, ±2, . . . , ±((N_g/2)−1)]. This results in the Golay AF having $N_d$ bins in the Doppler domain and hence an overall dimension of $N_g \times N_d$.

2) Further, append the delay axis of the Golay AF $A_{Ga,256,u}$(m, k) with extra (Nd−Ng) dummy delay bins and set their corresponding AF values to ∞, i.e., $A_{Ga,256,u}$ (m, k)=∞∀m≥$N_g$, k=0, ±1, . . . , ±($N_d$/2−1). Hence, the new delay axis of the Golay AF is extended as [m=0, 1, . . . , Nd]. This results in the Golay AF having the overall dimension of $N_d \times N_d$, which is equal to the dimension of the data AF, $A_{dat}$(m, k).

The above procedure results in both the Golay AF, $A_{Ga,256,u}$ and the data AF, $A_{dat}$ to have with same number of bins in both the delay and Doppler axes. Hence, the dimensions of the Golay AF and the data AF are compatible for min-point selection.

In communication standards, complementary sequences are at least in some cases used because they have an ideal auto-correlation. Two sequences x(n) and y(n) of equal length (equal to N) are called complementary if the sum of their auto-correlation equals the Kronecker delta function: $r_x(k)+r_y(k)=2N\delta(k)$, k=0, 1, . . . , N. The composite ambiguity function of the complementary sequences is:

$$A_{cmp}(m,k)=2[A_{xx}(m,k)+e^{j2\pi k}A_{yy}(m,k)] \qquad \text{(Eq. 11)}$$

The Golay sequences $Ga_{256,u}$ and $G_{b256,u}$ form a complementary pair. Hence, their composite ambiguity function is given by $$A_{GCC,u}(m,k)=2[A_{Ga256,u}(m,k)+e^{j2\pi k}A_{Gb256,u}(m,k)] \qquad \text{(Eq. 12a)}$$

Similarly, the composite ambiguity function of the Golay complementary sequences $Ga_{256,v}$ and $G_{b256,v}$ can be obtained as, $$A_{GCC,v}(m,k)=2[A_{Ga256,v}(m,k)+e^{j2\pi k}A_{Gb256,v}(m,k)] \qquad \text{(Eq. 12b)}$$

The point-wise average of $A_{GCC,u}$(m, k) and $A_{GCC,v}$(m, k) is denoted as $A_{GCC}$(m, k) and is given by, $$A_{GCC}(m,k) = \frac{1}{2}[A_{GCC,u}(m, k) + A_{GCC,v}(m, k)] \qquad \text{(Eq. 12)}$$

Although an ideal ambiguity function is represented by a spike of infinitesimal width that peaks at the origin and is zero everywhere else, every "practical" (i.e. physically relevant) ambiguity function has a main-lobe and some side-lobes. The main-lobe of the ambiguity function AF may be the lobe containing the highest power. The main-lobe width of the radar ambiguity function is a two dimensional quantity, denoted by MLW(Δτ, Δf), which captures the width of the main-lobe in the delay and Doppler axis of the AF. All the other lobes in the AF, i.e. other than the main-lobe, are called side-lobes. The side-lobe with the highest power is called the peak side-lobe and is denoted by PSL. The distance between the main-lobe and the peak side-lobe is captured using the two dimensional quantity d(τ, f), which denotes the distance between the highest point in the main-lobe and the highest point in the peak side-lobe in the delay and the Doppler axes respectively.

For good radar sensing properties, it is desirable that the radar ambiguity function has at least some of following properties: (1) A small MLW, or equivalently a narrow main-lobe, (2) Low peak side-lobe level, and/or (3) A high ratio of d(τ, f) to MLW(Δτ, Δf), which ensures that the side-lobe is distributed in both the delay domain (corresponding to distance) and the Doppler domain (corresponding to velocity).

In various embodiments, the comparing comprises applying a min-point selection method, which combines the compared data payload and the compared preamble part to a single final ambiguity function. This is an optimization of the methods discussed above.

To achieve this optimization, the AF of a good time domain and the AF of a good frequency domain waveform may be combined, to obtain a fused AF with a good performance in both the delay and Doppler domain. Based on the above considerations, the AF of a preamble sequence and the AF of a OFDM data sequence may be combined. A preamble sequence x(n), n=0, 1, . . . , N−1, transmitted over a single carrier in the time domain, may have an ambiguity function $A_{sc}$(m, k) of this single carrier sequence of Eq. 7. Similarly, with X(p), p=0, 1, 2, . . . , N−1 being the set of symbols that modulate the N sub-carriers of an OFDM waveform and let $A_{mc}$(m, k) denote the corresponding ambiguity function of this multi-carrier sequence, according to Eq. 9. Based on this, a combined ambiguity function may be created, i.e. by selecting the minima among the single carrier ambiguity function, $A_{sc}(m, k)$, and the multi-carrier ambiguity function, $A_{mc}(m, k)$. Equivalently, the final AF is obtained by taking the point-wise minima of the absolute value of the two AFs at each delay and Doppler bin. This results in the combined ambiguity function:

$$A_c(m,k)=\min\{|A_{sc}(m,k)|,|A_{mc}(m,k)|\} \qquad \text{(Eq. 13)}$$

Hence, a Minimum Selection Algorithm or min-point selection method (see Algorithm-1) may be based on the dual time-frequency signal processing (matched filtering), followed by a point-wise minimum operation. The detailed signal processing procedure as described in Algorithm-1 uses the Golay complementary sequence as the single carrier sequence and OFDM data as the multi-carrier sequence.

Algorithm-1

Inputs: Received single carrier Golay complementary sequences $Ga_{256,u}$, $Gb_{256,u}$, $Ga_{256,v}$, $Gb_{256,v}$ and OFDM data sequence Y(p).

Matched Filter: Pass the received sequences $Ga_{256,u}$, $Gb_{256,u}$, $Ga_{256,v}$, $Gb_{256,v}$ through the single carrier matched filter and Y(p) through the multi-carrier matched filter to obtain $A_{GCC}(m, k)$ $A_{dat}(m, k)$ from Eq. 12 and Eq. 10, respectively.

Min-point Selection: Obtain $A_c(m, k)$ using Eq. 13, by using $A_{sc}(m, k)$ as $A_{GCC}(m, k)$ and $A_{mc}(m, k)$ as $A_{dat}(m, k)$.

Output: $A_c(m, k)$.

This Algorithm-1 may be applied to various communication protocols. Below, an example is given by applying this to the IEEE 802.11ad protocol.

In various embodiments, the radar frequency range comprises a frequency range between 30 GHz and 300 GHz, particularly between 50 and 150 GHz, for instance between 57 GHz and 71 GHz.

In various embodiments, the communication signal uses Orthogonal Frequency-Division Multiplexing, OFDM, signal waveforms. As a physical channel, a wireless channel may be used. As a transmitter model, a signal alphabet (encoder) modulation by a pulse shape function may be used. The method and/or the communication system may support MIMO (multiple-input and multiple-output transmission), i.e. a method for multiplying the capacity of a radio link using multiple transmission and receiving antennas, e.g. in form of an antenna array.

In various embodiments, the communication signal supports at least one of these protocols: an IEEE 802.11a/g protocol, an IEEE 802.11n protocol, an IEEE 802.11ac protocol, an IEEE 802.11ad protocol, an IEEE 802.11p protocol, an IEEE 802.11bd protocol, proprietary protocols and/or further protocols adapted for communicating the communication signal within the radar frequency range.

An aspect relates to a computer program product comprising instructions, which, when the program is executed by a processor and/or a control unit, cause the processor and/or the control unit to carry out the method as described above and/or below.

An aspect relates to a computer-readable storage medium where a computer program or a computer program product as described above is stored on.

An aspect relates to a receiver for a joint radar and wireless communication, JRC, configured for performing a method as described above and/or below. The receiver may comprise an input stage, means for performing an ambiguity function, and/or evaluation means.

The receiver model may comprise a reception of multiple signals (at multiple antennas), Matched Filtering, RD map, and/or decision making, i.e. target detection and source number detection.

In various embodiments, the receiver is co-located to a corresponding transmitter configured for sending a communication signal. Co-located may, for instance, mean that the receiver and the corresponding transmitter are arranged, e.g., in the same housing and/or same chip.

In various embodiments, the receiver comprises a low noise amplifier, LNA, e.g. in its input stage, and/or a mixer configured for building an intermediate frequency, particularly by using the same oscillator signal as the transmitter.

An aspect relates to a communication system comprising a receiver as described above and/or below and a corresponding transmitter configured for sending a communication signal.

An aspect relates to a vehicle comprising a receiver and/or a communication system as described above and/or below.

An aspect relates to a use of a receiver as described above and/or below or of a method for both wireless communication and for radar sensing as described above and/or below.

BRIEF DESCRIPTION OF THE DRAWINGS

The drawings depict:

FIG. 7A to 7C a simulation of a communication system according to a further embodiment;

FIG. 8 a flow diagram according to an embodiment;

DETAILED DESCRIPTION OF EMBODIMENTS

Figure 1:
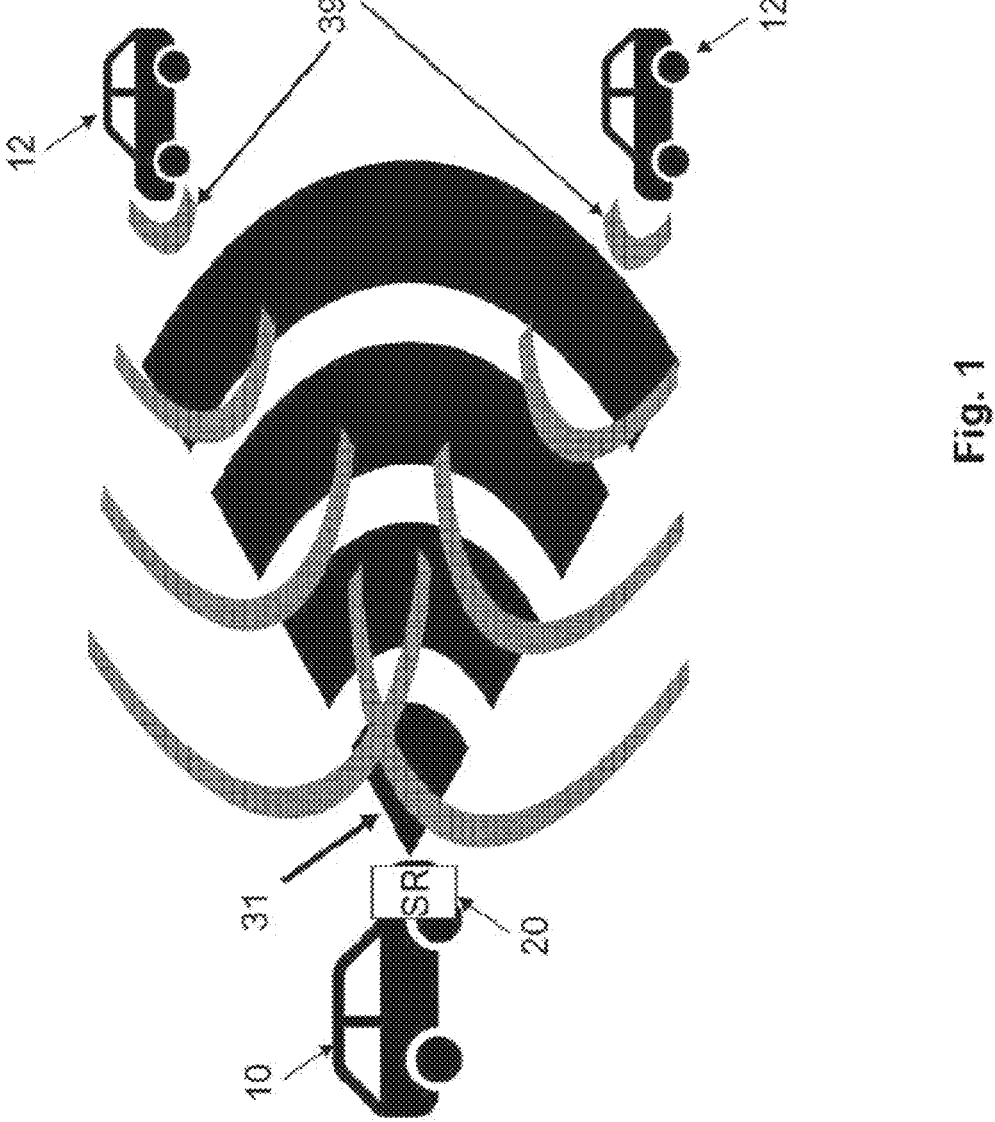
FIG. 1 schematically a vehicle according to an embodiment.

FIG. 1 schematically shows a vehicle 10 according to an embodiment. The vehicle 10 comprises a communication system 20 comprising a box "SR" with a sender or transmitter 30 (see below) and a receiver 40. The transmitter 30 of the communication system 20 may send a sent communication signal 31. The sent communication signal 31 is reflected by two objects 12, depicted as vehicles. A reflected communication signal 39 is received and evaluated by the receiver 40 of the communication system 20.

Figure 2:
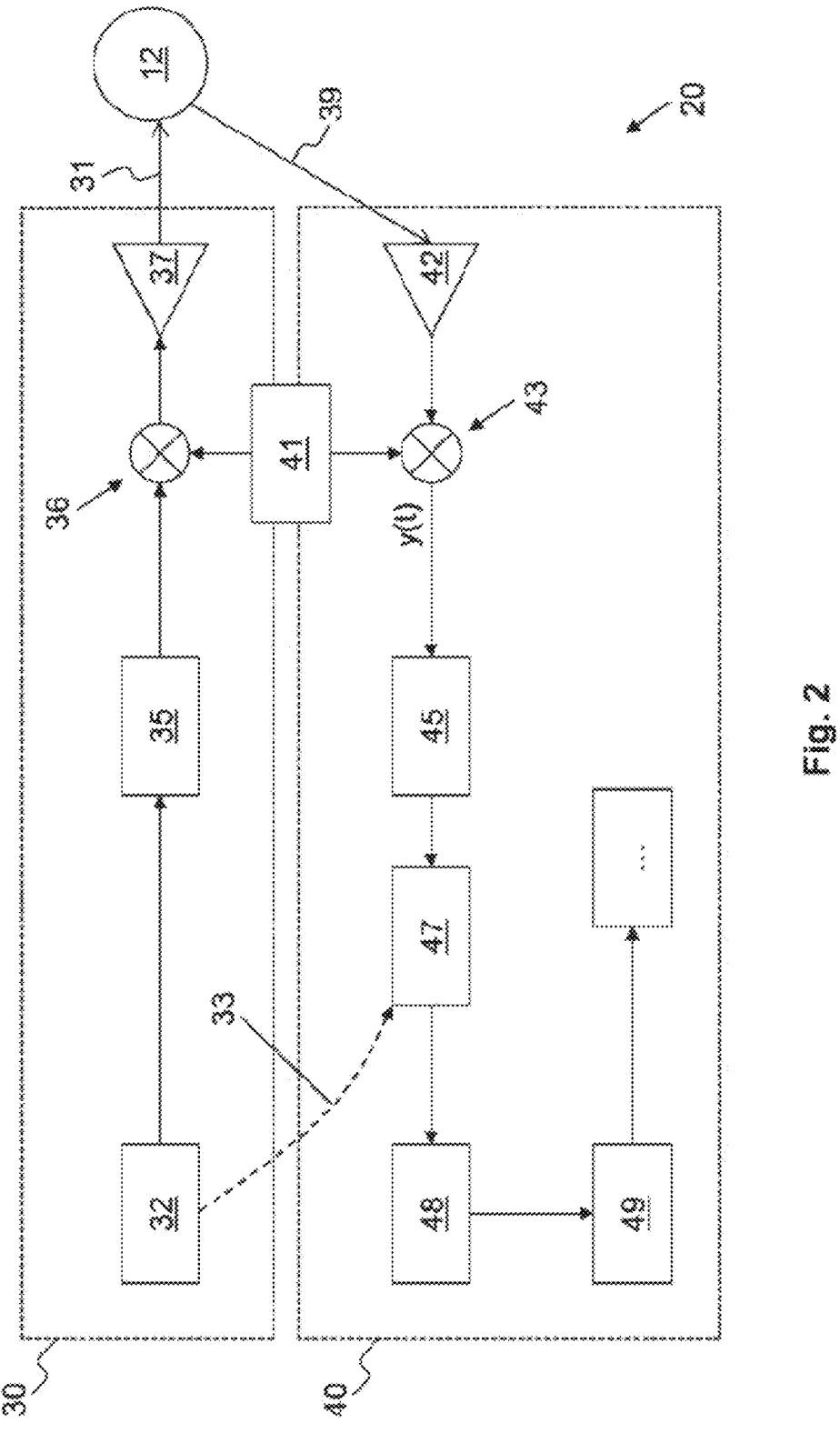
FIG. 2 schematically a communication system according to an embodiment.

FIG. 2 shows schematically a communication system 20 according to an embodiment. The communication system 20 comprises a sender or transmitter 30 and a receiver 40. The transmitter 30 comprises a protocol machine 32, which may output a bit-sequence according to the protocol used in the communication system 20. RF (radio frequency) related component 35 may perform tasks like pulse shaping the output of protocol machine 32. A first mixer 36 may mix the output of RF related component 35 with a high-frequency oscillator 41, resulting in a frequency within a radar frequency range. The radar frequency range may be a range above 30 MHz, e.g. between 30 GHz and 300 GHz, particularly between 50 and 150 GHz, for instance between 57

GHz and 71 GHz or between 76 GHz and 78. The transmitter 30 may send, via output stage 37, a sent communication signal 31. The output stage 37 may comprise an antenna, e.g. a horn antenna, and/or a MIMO antenna. The output stage 37 may use Quadrature Amplitude Modulation, QAM, and/or Orthogonal Frequency-Division Multiplexing, OFDM, signal waveforms. The sent communication signal 31 is reflected by at least one object 12. Thus, a reflected communication signal 39 is the sent communication signal 31 that is reflected by at least one object.

The reflected communication signal 39 may be received by an input stage 42 of the receiver 40. The input stage 42 may comprise a low noise amplifier, LNA. A second mixer 43 may build an intermediate frequency (IF) signal y(t). In FIG. 2, the second mixer 43 uses the same oscillator 41 signal as the transmitter 30; this variation may be useful, particularly in cases when the transmitter 30 and the receiver 40 are co-located, e.g. located in the same region of a car, in the same housing, and/or in the same component (e.g. board or chip). In component 45, the IF signal may be transformed into frequency domain by an FFT (Fast Fourier Transform) component. The resulting signal may be applied to a matched filter or a bank of correlators 47, e.g. by applying a method related to building an ambiguity function. For building the radar ambiguity function, the signal may be compared to the output of protocol machine 32, as depicted by a broken-line arrow 33. Due to this kind of comparing, the sent communication signal can be any kind of bit-sequence, i.e. no predefined bit-sequence is necessary to use the sent bit-sequence—i.e. a part of the sent communication signal 31 that is evaluated by the receiver 40—for radar sensing. Of course, a predefined bit-sequence can (also) be part of the evaluated part of the sent communication signal 31. A min-point selection algorithm in component 48 may obtain a final ambiguity function (AF) by taking point-wise minima of the AF at each delay and Doppler bin. Component 49 may evaluate the final AF, e.g. for delay and Doppler properties.

Figure 3:
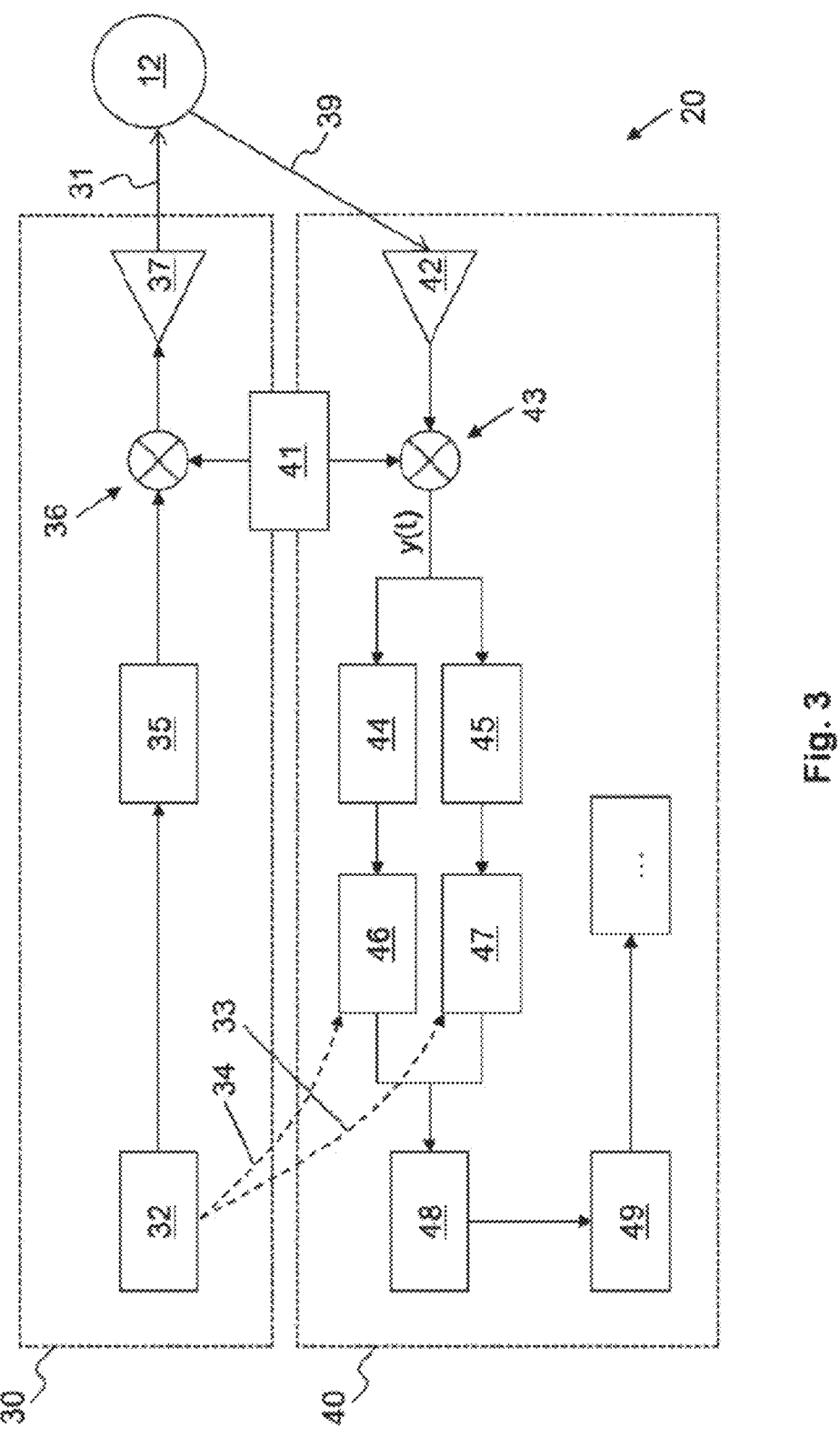
FIG. 3 schematically a communication system according to a further embodiment.

FIG. 3 shows schematically a communication system 20 according to a further embodiment. Compared to FIG. 2, implements a combined ambiguity function, i.e. by selecting, in a min-point selection algorithm component 48, the minima among the single carrier ambiguity function, $A_{sc}(m, k)$, and the multi-carrier ambiguity function, $A_{mc}(m, k)$. For this, the output y(t) of the mixer 43 is split, i.e. the single carrier and the OFDM symbols are split and passed separately through the matched filters 44 and 46 for the OFDM data symbols, and 45 and 47 for the SC GCC symbols, thus realizing Eq. 10 or Eq. 12, respectively. The output of these matched filters are then combined or fused and their point-wise minima taken, according to Eq. 13 (see above) to obtain the final ambiguity function. So, the min-point selection method is applied to the fused waveform that comprises at least the reflected data payload and the reflected preamble part. As a possible equivalent, the final ambiguity function may be obtained by taking point-wise minima of the absolute values of the two AFs—i.e. the outputs of both 46 and 47—at each delay and Doppler bin; see also FIG. 9. The final ambiguity function may be used for estimation of delay and Doppler of the targets buried in the received signal, and/or for further evaluation, as depicted by a " . . . "-box.

Figure 4:
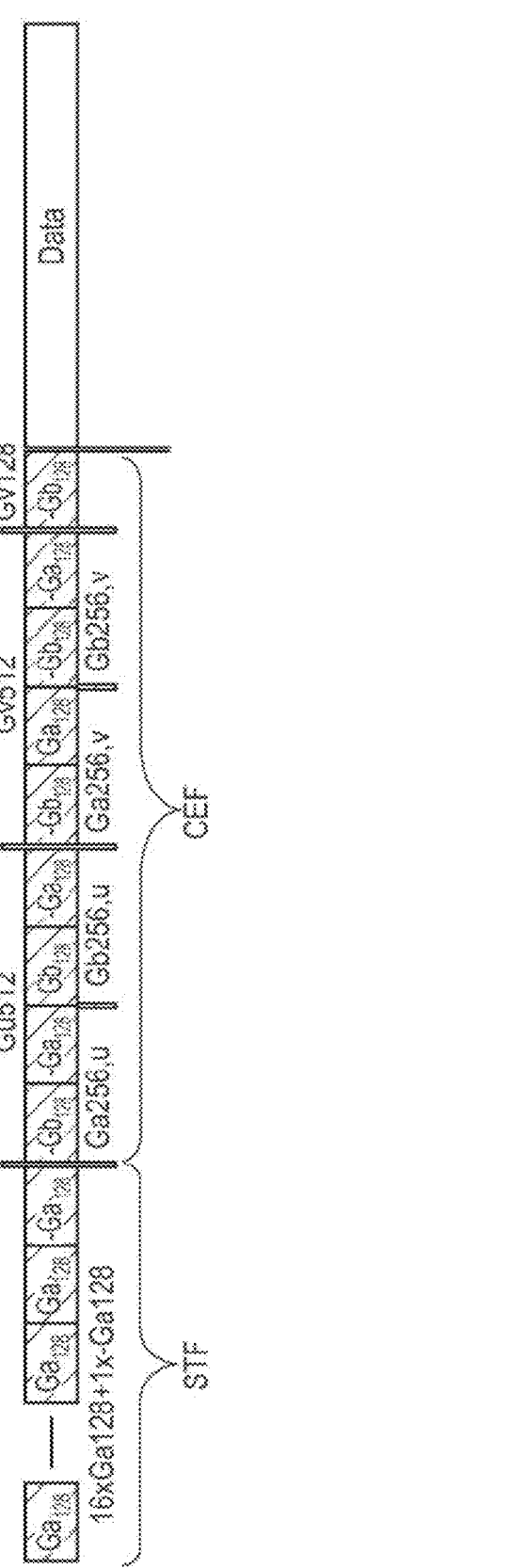
FIG. 4 schematically a section of an IEEE 802.11ad protocol bit-sequence.

FIG. 4 shows schematically a section of an IEEE 802.11ad protocol bit-sequence. The section shown comprises the IEEE 802.11ad PHY frame's preamble with STF (Short Training Field) and CEF (Channel Estimation Field). The header packet that contains information such as the modulation and coding scheme (MCS) and the length of PHY payload, the data payload packet whose length varies in terms of number of bytes/octets, and the optional automatic gain control (AGC) and training (TRN) packet which can be used to optimize beam-forming setting. The STF and CEF in the preamble are generated from a Golay complementary codes (GCC) of length N=128 as the building blocks. These building block sequences are called $Ga_{128}$ and $Gb_{128}$, where the a and b indicate that $Ga_{128}$ and $Gb_{128}$ form a complementary pair.

In addition, a Data section is shown. The Data section may comprise arbitrary bits.

Figure 5:
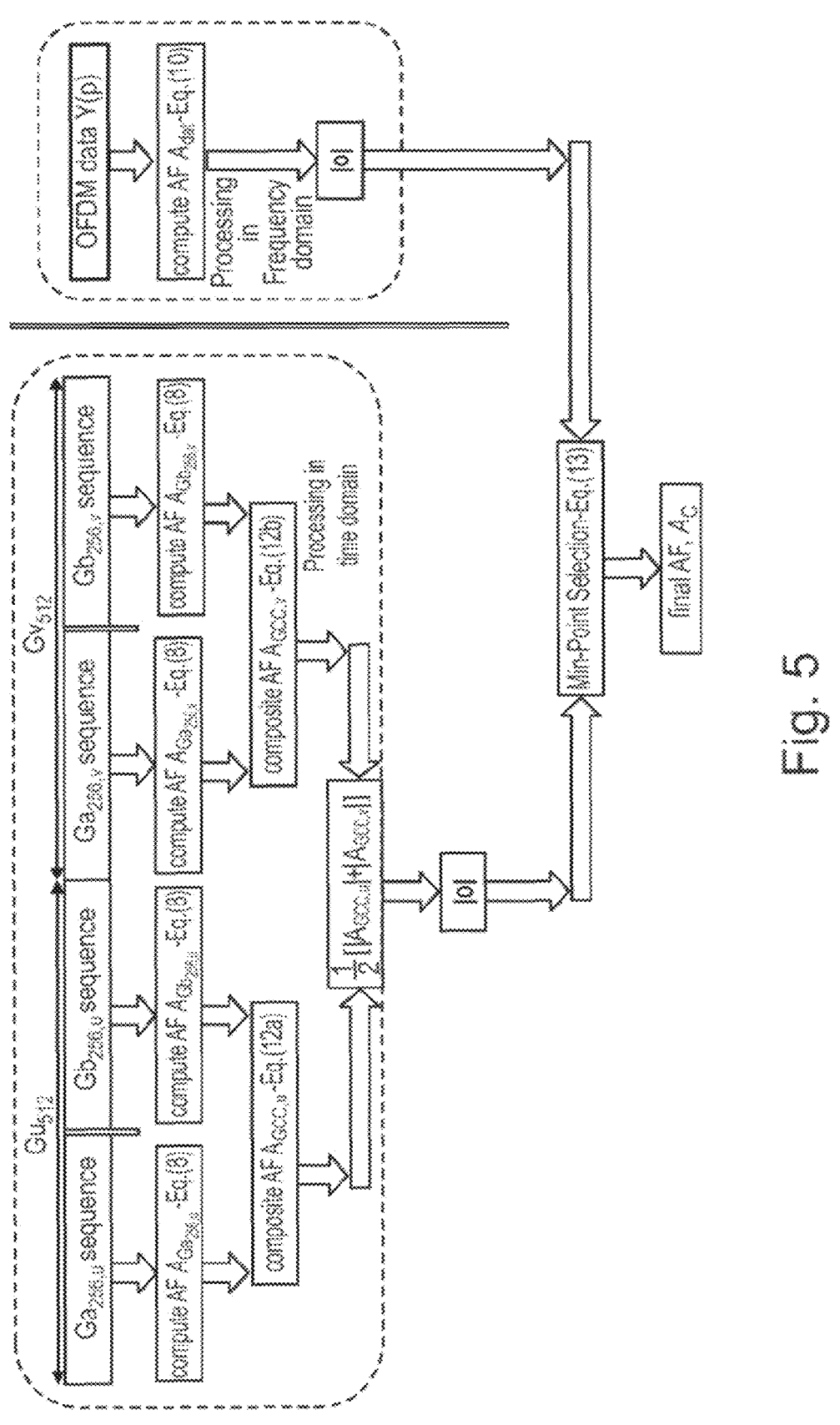
FIG. 5 schematically a method for applying a combined ambiguity function to the IEEE 802.11ad protocol.

The combining algorithm uses two pairs of GCC in CEF packet. FIG. 4 shows the detailed CEF structure. The CEF consists of two 512 length sequences followed by a $Gb_{128}$ sequence. The 512 length sequences are labelled as Gu512 and Gv512. Both these sequences are made up of 256 length GCC, denoted respectively as $[Ga_{256,u}, Gb_{256,u}]$ and $[Ga_{256,v}, Gb_{256,v}]$. For the radar function, the delay and Doppler values of the targets are estimated using the min-point selection algorithm, as described in Algorithm-1. To this end, the sequences of $Ga_{256,u}$, $Ga_{256,v}$ and the random OFDM data of length Nd are used to generate the single carrier time domain and the multi-carrier frequency domain ambiguity function (AF), respectively. The time domain AF generated from the GCC pair may be denoted as $Ga_{256,u}$, $Ga_{256,v}$ using Eq. 12 as $A_{GCC}(m, k)$ and similarly the frequency domain AF generated from all the symbols of the usually large data payload may be denoted, using Eq. 10, as $A_{dat}(m, k)$. These two AFs are combines by the point-wise minimum operation to obtain the combined AF, $A_c(m, k)$, as illustrated in FIG. 5. The modifications in an implementation of a radar receiver 40 for obtaining the delay and Doppler estimates from the combined AF are shown in FIG. 3.

FIG. 5 shows schematically a part of a receiver 40 that applies a method for a combined ambiguity function to the IEEE 802.11ad protocol. After having split y(t)—as depicted in FIG. 3—, the single carrier and the OFDM symbols and passed separately through the matched filters. For each of the $Ga_{256}$, $Gb_{256}$ sequence, AF is computed, using Eq. 12 as $A_{GCC}(m, k)$. Similarly, the frequency domain AF generated from all the symbols of the—usually large—data payload is computed, using Eq. 10, as $A_{dat}(m, k)$. The final AF is obtained by taking point-wise minima of the AF at each delay and Doppler bin, according to Eq. 13. The resulting Single Target performance improvements are shown in FIG. 6A to 6C, and the Multi-target performance improvements are shown in FIG. 7A to 7C.

Figures 6A, 6B, 6C:
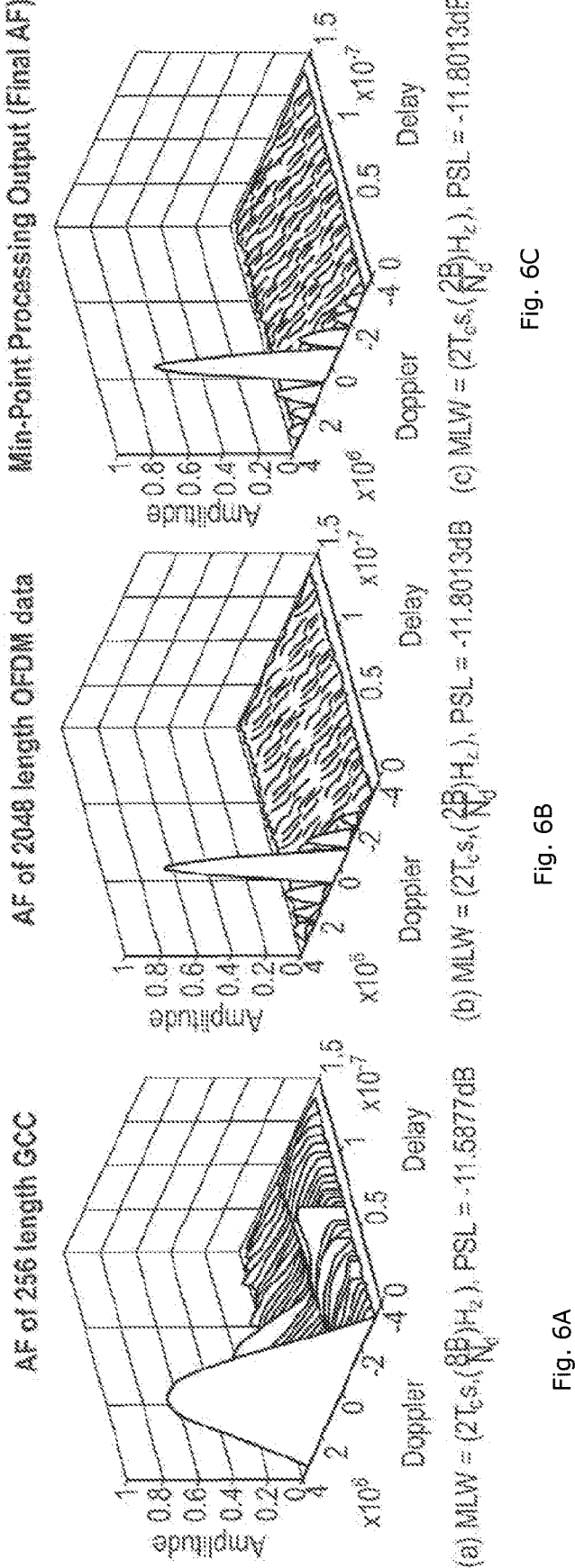
FIG. 6A to 6C a simulation of a communication system according to an embodiment.

FIG. 6A to 6C show a simulation of a communication system according to an embodiment, particularly Single Target performance improvements by the method as described above and/or below. The figures show an amplitude of the signals over a "Delay" and a "Doppler" value. As a performance measure of the resolution, the main-lobe width of the ambiguity function is considered, i.e. an improvement in the narrowness of the MLW due to the min-point selection algorithm is evaluated. Let the MLW of the AF of the single carrier Golay complementary sequence $(A_{GCC}(m, k))$ be $MLW_{GCC}(\Delta\tau T, \Delta f)$ and the MLW of the AF of the random OFDM data sequence $(A_{dat}(m, k))$ be $MLW_{dat}(\Delta\tau, \Delta f)$. Then, the width of the main-lobe of the final AF, Ac(m, k) generated by the min-point selection method is $$MLW_c(\Delta\tau) = \min\{MLW_{GCC}(\Delta\tau), MLW_{dat}(\Delta\tau)\} \qquad \text{(Eq. 14a)}$$

$$MLW_c(\Delta f) = \min\{MLW_{GCC}(\Delta f), MLW_{dat}(\Delta f)\} \qquad \text{(Eq. 14b)}$$

It can be observed that the $MLW_c(\Delta\tau, \Delta f)$ is the minimum of the single carrier Golay MLW or the random OFDM data MLW. As all the data symbols are used, the MLW of the is 2B/Nd. As a result, using the long data sequence improves the performance, but the combined waveform has an even better resolution than the individual resolutions.

A further performance measure of the radar sensing performance may be the height of the peak side-lobe level. The peak side-lobe level is measured with respect to the main-lobe. As shown in FIG. 6A to 6C, the $PSL_c$ of the final AF generated by the min-point selection scheme is upper bounded by the PSL level of the AF due to the single carrier Golay complementary sequence and the PSL of the AF due to the random OFDM data sequence as $$PSL_c \leq \max\{PSL_{GCC}, PSL_{dat}\} \qquad \text{(Eq. 15)}$$

where $PSL_{GCC}$ is the PSL w.r.t the main-lobe for the AF due to the single carrier Golay complementary sequence and $PSL_{dat}$ is the PSL w.r.t the main-lobe for the AF due to the OFDM sequence. Hence, in the worst case, the peak side-lobe level PSL is the maximum of the two PSLs. However, the worst case seldom occurs and usually, there is an improvement in the PSL. FIG. 6A to 6C illustrate this improvement for the proposed min-point selection algorithm using the 256 length single carrier Golay complementary sequence and $N=N_d$ length random OFDM data sequence.

A further performance measure of the radar sensing performance, particularly of the resolution may be the ratio of the distance of the PSL to the main-lobe width as this ratio shows if the side-lobe interferes with the main-lobe and hence affects the detection performance of the target. Again, this quantity does not have a closed form expression. From FIG. 6A to 6C can be concludes that the side-lobe does not interfere significantly in the case of final AF, as compared to the single carrier transmission.

FIG. 6A to 6C show the increase in the resolution due to the proposed min-point selection algorithm. FIG. 6A shows an AF of 256 bits long GCC data. FIG. 6B shows an AF of 2048 bits long OFDM data. It is clearly visible that using the long OFDM data leads to a significantly smaller main-lobe. Thus, the receiver 40 according to FIG. 2 leads to a highly increased performance of the radar sensing. FIG. 6C shows a Final AF when applying the min-point selection algorithm to both data sets, as implemented in the receiver 40 according to FIG. 3.

Further simulation results to verify the performance of the min-point selection based radar sensing technique are presented in FIG. 7A to 7C. The simulation set-up consists of a transmission of two $N_g$=256 bits long GCC sequences $Ga_{256}$ and $Gb_{256}$ and a $N_d$=2048 bits long random OFDM data payload. The single carrier symbol duration is Tc=1/ B=(1/1.760) ns=0.56818 ns. The received signal consists of an echo from 3 targets whose $(\tau, f)$ coordinates relative to the transmitter are (39.77 ns, 0 MHz), (0 ns, 2.417 MHz) and (18.18 ns, 0 MHz) respectively. At the receiver, the estimates of the delay and Doppler for the three targets are recovered by conventional radar processing and by using the min-point selection based radar sensing described in Algorithm-1.

The results from the conventional radar sensing are shown in FIG. 7A to 7C. The radar signal is reflected by three objects 12 (see FIGS. 1 to 3) or targets. FIG. 7a shows an AF of 256 bits long GCC data. FIG. 7B shows an AF of 2048 bits long OFDM data. It is clearly visible that using the long OFDM data leads to significantly smaller main-lobes for all the three targets. Thus, the receiver 40 according to FIG. 2 leads to a highly increased performance of the radar sensing. FIG. 7C shows a Final AF when applying the min-point selection algorithm to both data sets, as implemented in the receiver 40 according to FIG. 3. It is clearly visible that the output of the min-point selection algorithm has lower average side-lobe level and better Doppler resolution than shown in the other figures.

FIG. 8 shows a flow diagram 50 according to an embodiment, depicting a method for a radar and wireless communication, JRC. In a step 52, a reflected communication signal 39 (see, e.g., FIGS. 2 and 3) is received. The receiving step may be performed by using an input stage of a receiver. The reflected communication signal 39 is a sent communication signal 31 that is reflected by at least one object 12, wherein the frequency of the sent communication signal 31 is within a radar frequency range. The sent communication signal 31 at least comprises a sent data payload and the reflected communication signal 39 at least comprises a corresponding reflected data payload. In a step 54, the reflected communication signal 39 compared to the sent communication signal 31, resulting in a compared communication signal. The comparing step may be performed, for instance, applying an ambiguity function, and/or using a matched filter or a bank of correlators. In some embodiments, the comparing may comprise to split the reflected communication signal according to parts of the communication protocol(s) used. In some embodiments, the split waveform may be combined to a fused waveform. In a step 56, a delay information and/or a velocity information of the at least one object 12 is extracted from the compared communication signal. In some embodiments, before the step 56, a min-point selection method may be applied.

Figure 9:
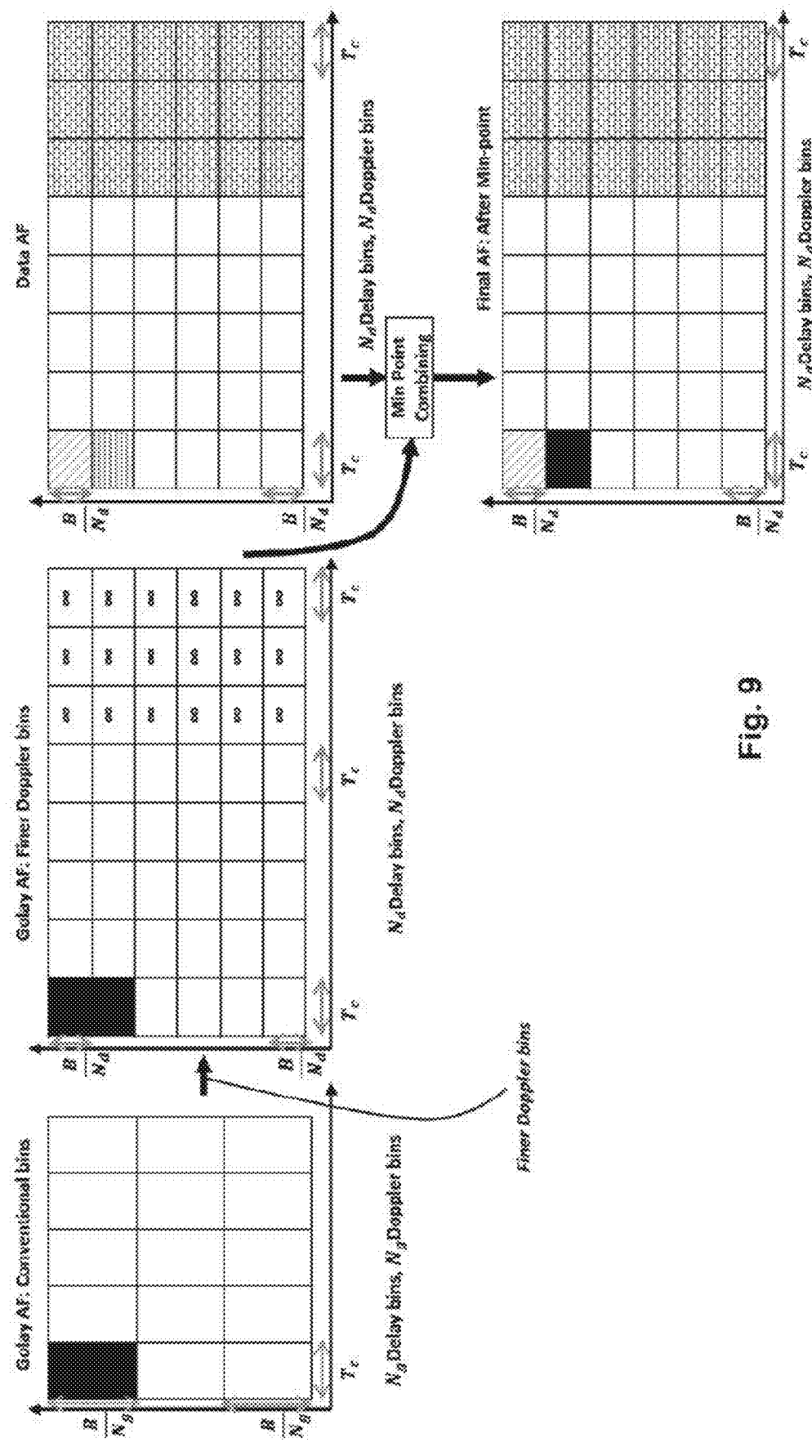
FIG. 9 a schematic sketch of the "bin" concept.

FIG. 9 shows a schematic sketch of the "bin" concept and the related procedure. For performing the min-point selection, i.e. that the AF of the data sequence, $A_{dat}(m, k)$, as well as the AF of the Golay sequence, $A_{GCC}(m, k)$, may have the same number of bins and same bin-widths. Let the length of the Golay sequence be $N_g$ and the length of the data sequence be $N_d$. In the following, we describe the procedure for re-sampling and appending the Golay AF for obtaining the same number of bins as the data AF:

1) Sample the Doppler axis in the Golay AF $A_{GCC}(m, k)$ by finer bins at $k/N_d$, with k=[0, ±1, ±2, . . . , ±((Nd/2)−1)] instead of previous bins at $k/N_g$, [k=0, ±1, ±2, . . . , ±((Ng/2)−1)]. This results in the Golay AF having Nd bins in the Doppler domain and hence an overall dimension of $N_g \times N_d$.

2) Further, append the delay axis of the Golay AF $A_{GCC}$ (m, k) with extra $(N_d-N_g)$ dummy delay bins and set their corresponding AF values to ∞, i.e.: $A_{GCC}(m, k)=\infty \forall m \geq N_g$, k=0, ±1, . . . , ±(Nd/2−1). Hence, the new delay axis of the Golay AF is extended as [m=0, 1, . . . , Nd]. This results in the Golay AF having the overall dimension of Nd×Nd, which is equal to the dimension of the data AF, $A_{dat}(m, k)$.

This procedure results in both the Golay AF, $A_{GCC}$, and the data AF, $A_{dat}$, to have the same number of bins in both the delay and Doppler axes. Hence, the dimensions of the Golay AF and the data AF are compatible, and min-point selection can be applied also to this set of protocol-parts.

LIST OF REFERENCE SYMBOLS 10 vehicle
12 object(s)
20 communication system
30 transmitter
31 sent communication signal
32 protocol machine
33, 34 arrows 35 RF related component
36 first mixer
37 output stage
39 reflected communication signal
40 receiver
41 oscillator
42 input stage (comprising an LNA)
43 second mixer
44-47 component
48 min-point selection component
49 component
50 flow diagram
52-56 steps

The invention claimed is:

1. A method for radar sensing using wireless communication signals, comprising:

receiving, by a receiver, a reflected communication signal corresponding to a sent communication signal reflected by at least one object, the sent communication signal having a frequency within a radar frequency range;

wherein the sent communication signal comprises a sent data payload comprising non-standardized bit-sequences and the reflected communication signal comprises a corresponding reflected data payload comprising bit-sequences corresponding to the non-standardized bit-sequences;

comparing, by signal-processing circuitry, the corresponding reflected data payload with the sent data payload to produce a compared data payload; and extracting, by evaluation circuitry, delay information and/or velocity information of the at least one object from the compared data payload.

2. The method of claim 1, wherein the sent communication signal further comprises a sent preamble part and the reflected communication signal further comprises a corresponding reflected preamble part;

the comparing comprises a comparison of the sent preamble part with the corresponding reflected preamble part to produce a compared preamble part; and the extracting comprises deriving the delay information and/or the velocity information based on the compared preamble part.

3. The method of claim 1, wherein the comparing comprises generating an ambiguity function by correlating;

the corresponding reflected data payload with the sent data payload; and/or the corresponding reflected preamble part with the sent preamble part, using a matched filter or a bank of correlators.

4. The method of claim 2, wherein the comparing further comprises applying a min-point selection, which combines the compared data payload and the compared preamble part into a single ambiguity function.

5. The method of claim 1, wherein the radar frequency range is between 30 GHz and 300 GHZ.

6. The method of claim 1, wherein the communication signal uses Orthogonal Frequency-Division Multiplexing, (OFDM) signal waveforms.

7. The method of claim 1, wherein the communication signal conforms to at least one of IEEE 802.11a, IEEE 802.11g, IEEE 802.11n, IEEE 802.11ac, IEEE 802.11ad, IEEE 802.11p, IEEE 802.11bd, or a proprietary protocol adapted for communicating the communication signal within the radar frequency range.

8. A non-transitory computer-readable storage medium comprising a computer program product having instructions stored thereon which, when executed by a processor and/or a control unit, cause the processor and/or the control unit to carry out the method of claim 1.

9. A non-transitory computer-readable storage medium on which a computer program according to claim 8 is stored.

10. A receiver for joint radar and wireless communication (JRC), the receiver comprising signal-processing circuitry configured to perform the method of claim 1.

11. The receiver of claim 10, wherein the receiver is co-located with a transmitter configured to transmit the communication signal.

12. The receiver of claim 10, wherein the receiver comprises a low noise amplifier (LNA) and/or a mixer configured to generate an intermediate frequency, and wherein the receiver and the transmitter are configured to use a common oscillator signal.

13. A communication system comprising the receiver according to claim 10 and a corresponding transmitter configured to transmit a communication signal.

14. A vehicle comprising the receiver according to claim 10 and/or a communication system comprising the receiver and a corresponding transmitter configured to transmit a communication signal.

15. The method of claim 5, wherein the radar frequency range is between 50 GHz and 150 GHz.

16. The method of claim 5, wherein the radar frequency range is between 57 GHz and 71 GHz.

* * * * *